J. F. O'CONNOR.
FRICTION SHOCK ABSORBING MECHANISM.
APPLICATION FILED OCT. 24, 1921.
1,433,293.
Patented Oct. 24, 1922.
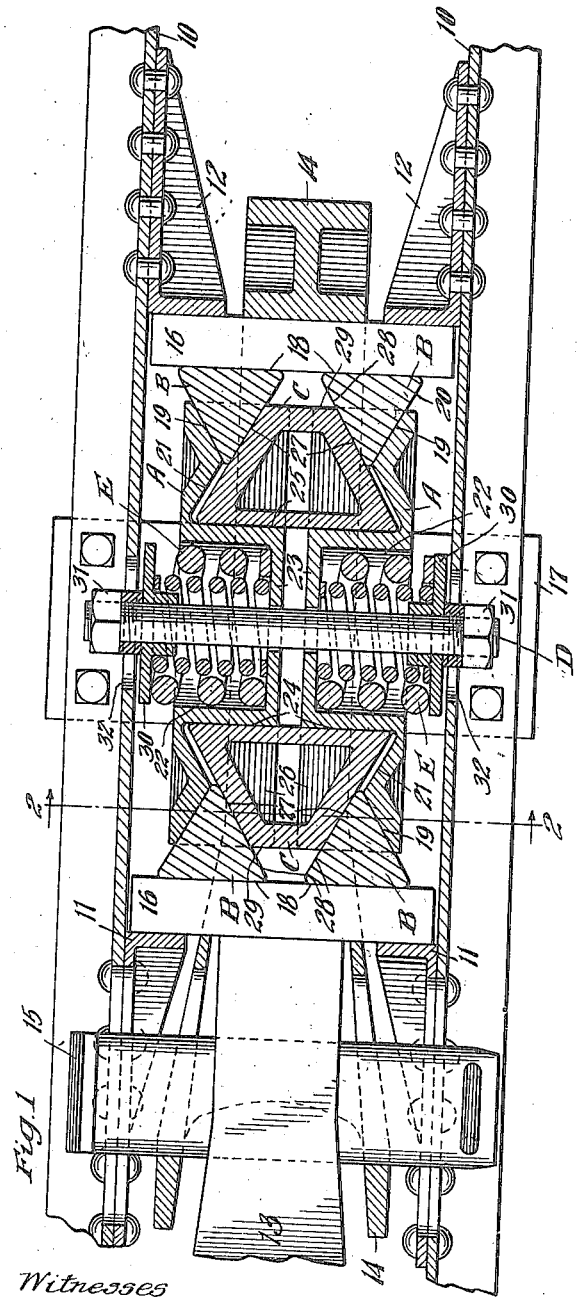
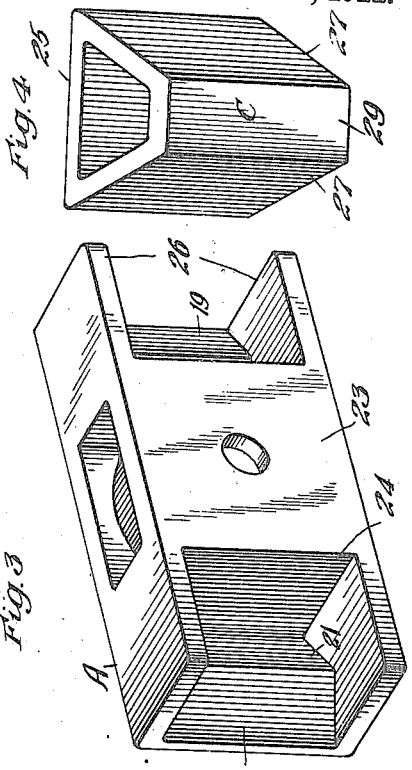
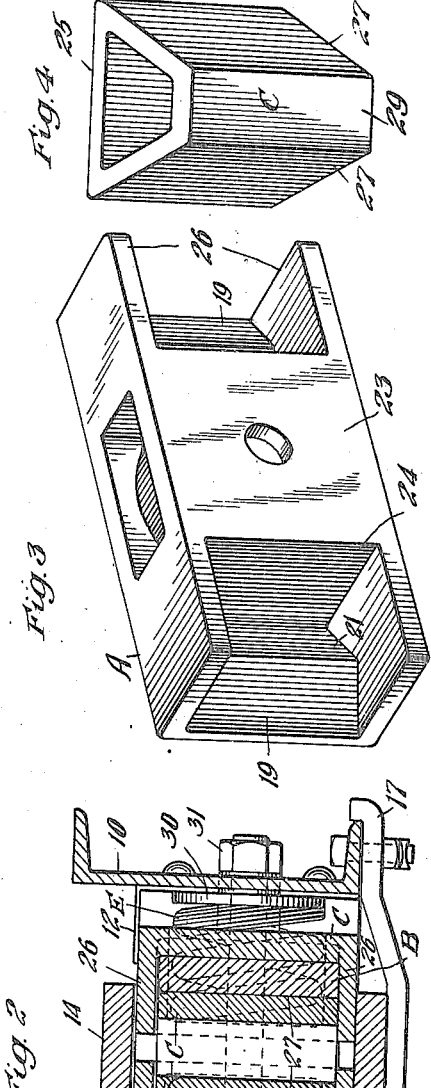
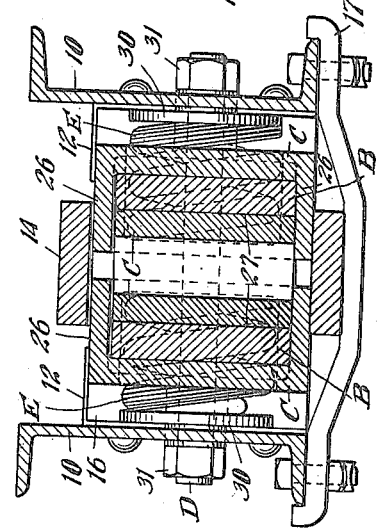
Witnesses
Wm. Geiger
Inventor
John F. O'Connor
By Geo. I. Haight
His Atty.

Patented Oct. 24, 1922.

1,433,293

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed October 24, 1921. Serial No. 509,769.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

The object of the invention is to provide a friction shock absorbing mechanism especially adapted for railway draft riggings and wherein are obtained large frictional wearing areas and all of the friction generating elements so designed as to allow of relatively inexpensive manufacture in the form of castings.

Other objects of the invention will more clearly appear from the description and claims hereinafter following.

In the drawing forming a part of this specification, Figure 1 is a horizontal longitudinal sectional view of a portion of a railway draft rigging showing my improvements in connection therewith. Fig. 2 is a vertical transverse sectional view corresponding substantially to the line 2—2 of Fig. 1. And Figs. 3 and 4 are detail perspectives of one of the side friction elements and one of the central friction blocks respectively.

In said drawing, 10—10 denote channel draft sills of a railway car underframe to the inner faces of which are secured front stop lugs 11 and rear stop lugs 12. A portion of a drawbar is indicated at 13, the same being operatively associated with the friction shock absorbing mechanism proper by a hooded cast yoke 14 and coupler key 15. The yoke, the friction shock absorbing mechanism proper therewithin and the front and rear followers 16—16 are supported in operative position by a detachable saddle plate 17.

The improved shock absorbing mechanism proper, as shown, comprises two side friction elements A—A; four end wedges arranged in front and rear pairs B—B; two centrally disposed independent friction blocks C—C; a transverse bolt D; and a pair of springs E—E.

The four end wedges B—B, arranged in pairs, two at each end, are of like construction and each is preferably in the form of an equilateral triangle in cross-section, as clearly shown in Fig. 1. Said wedges B—B extend in a generally vertical direction and have frictional contact with the end follower 16 on the surfaces 18—18.

The two side friction elements A which extend longitudinally of the device, are also of like construction and each is provided at each end thereof with vertically arranged inwardly inclined wedge surfaces 19—19, cooperable with corresponding surfaces 20—20 of the adjacent end wedges B—B. Inwardly of the wedge friction surfaces 19, the web of the friction element A is oppositely inclined, as indicated at 21—21 so as to provide clearance for the blocks C and leave a space therebetween as clearly indicated in Fig. 1 to compensate for wear on the parts, thus allowing the side friction elements A to gradually work inwardly toward each other. Centrally of each element A and between the inclined webs 21, each element A is formed with an inwardly extended cylindrical spring pocket 22, having a bottom wall 23 upon which the corresponding spring E is seated. At the front and rear of the spring pocket 22, each element A is formed with transversely extending friction surfaces 24—24 to cooperate with corresponding transversely extending friction surfaces 25 formed at the inner ends of the friction blocks C. Each element A is also provided with upper and lower horizontally extending flanges 26—26 at each end which straddle the friction blocks C and end wedges B so as to hold said parts in proper position vertically.

The central friction blocks C are of like construction each having inclined wedge-friction surfaces 27—27 on its sides, cooperable with the corresponding inner wedge surfaces 28—28 of the end wedges B. In normal position of the parts, the outer end faces 29 of the blocks C are flush with the ends of the side friction elements A.

The two springs E are of common form and of such length as to terminate within the planes of the draft sills 10. The outer ends of the springs E are engaged by spring followers 30 mounted on the transversely extending bolt D and limited in their outward movement by the nuts 31 on the bolts. The ends of the bolt D, the nuts 31 and portions of the hubs on the spring followers 30 are accommodated in longitudinally extending slots 32 provided in the draft sills. In certain types of friction gears now on the market, elongated openings in the draft sills are necessary to accommodate a transversely extending bolt and springs disposed on the outer sides of the sills. My construction is adapted to be interchanged with such types of gears and at the same time avoid locating the springs outside of the sills which is a feature objected to by certain users.

The operation is as follows, assuming an inward or buffing movement of the drawbar. As the drawbar moves inwardly together with the front follower 16, the front pair of end wedges B are moved rearwardly at the same rate. Due to the wedge-engagement between said wedges B and the block C and side friction elements A, the side friction elements A are caused to spread apart laterally against the yielding resistance of the springs E, it being evident that the action is simultaneous at each end of the mechanism. As will be understood, the wedges B are also caused to move laterally, thus generating friction between said wedges and the followers 16. In addition to the friction generated between the wedges B and the side elements A and blocks C, I obtain the additional transverse friction surfaces of the blocks C and side elements A, without sacrifice of strength of the parts and at the same time maintaining a compact structure capable of being employed in the standard spacing allowed on railway cars.

All of the parts A, B and C are of substantial construction and may be manufactured at comparatively small expense in the form of ordinary castings, thus insuring a relatively inexpensive complete device.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with front and rear end pairs of wedges longitudinally and laterally movable; of longitudinally extending side friction elements laterally movable and having frictional engagement at their ends with said end wedges; centrally located front and rear friction blocks, each interposed between a pair of end wedges and frictionally cooperable therewith, said blocks and side friction elements having frictionally cooperable transversely extending surfaces; and spring means cooperable with said side friction elements to yieldingly resist lateral separation thereof.

2. In a railway draft rigging, the combination with draft sills having front and rear stop-acting means, and front and rear followers; of a shock absorbing mechanism interposed between said followers, said mechanism including; front and rear end pairs of wedges longitudinally and laterally movable and frictionally cooperable with the followers; longitudinally extending side friction elements laterally movable and having frictional engagement at their ends with the end sets of wedges; centrally located front and rear friction blocks, each interposed between a pair of end wedges and frictionally cooperable therewith, said blocks and side friction elements having transversely extending cooperable friction surfaces; and spring means cooperable with said side friction elements to yieldingly resist lateral separation thereof, said spring means being confined entirely between the draft sills.

3. In a friction shock absorbing mechanism, the combination with front and rear end pairs of wedges longitudinally and laterally movable; of longitudinally extending side friction elements laterally movable and having end wedge friction surfaces cooperable with said end wedges; centrally located front and rear friction blocks, each interposed between a pair of end wedges and frictionally cooperable therewith, said blocks and side friction elements having transversely extending cooperable friction surfaces; and spring means cooperable with said side friction elements to yieldingly resist lateral separation thereof.

4. In a friction shock absorbing mechanism, the combination with front and rear end pairs of wedges longitudinally and laterally movable; of front and rear end followers on which said end wedges bear and frictionally cooperable therewith; longitudinally extending side friction elements having inwardly inclined end wedge friction surfaces cooperate with said end wedges; centrally disposed front and rear friction blocks of wedge-shape, each interposed between and having wedge-friction-engagement with a pair of end wedges, said blocks and side friction elements having transversely extending cooperable friction surfaces; and spring means cooperable with said side friction elements to yieldingly resist lateral separation thereof.

5. In a friction shock absorbing mechanism, the combination with front and rear end pairs of wedges longitudinally movable; of longitudinally extending side friction elements laterally movable and having frictional engagement at their ends with said end wedges, each side friction element having a centrally disposed inwardly extended spring pocket and transversely extending friction surfaces at the front and rear of the spring pocket; central front and rear friction blocks, each having wedge-engagement with a pair of end wedges and a transversely extending friction surface cooperable with transversely extending friction surfaces of said side friction elements; and a spring disposed in each of said spring pockets.

6. In a railway draft rigging, the combination with draft sills having front and rear stop-acting means, and front and rear followers; of front and rear pairs of end wedges on the inner sides of said followers and frictionally cooperable therewith; laterally movable longitudinally extending side friction elements having oppositely inclined wedge friction surfaces at their ends, a centrally disposed inwardly extended spring pocket and transversely extending friction surfaces intermediate the spring pocket and the end wedge surfaces; independent centrally located friction blocks of wedge form, each having wedge-friction-engagement with a pair of end wedges and transverse frictional engagement with transverse friction surfaces of the side elements, said side friction elements being laterally slightly spaced from said blocks; a transversely extending coil spring in each of said spring pockets, said springs being confined entirely between the sills; and means for retaining the outer ends of said springs against lateral movement.

In witness that I claim the foregoing I have hereunto subscribed my name this 18th day of Oct. 1921.

JOHN F. O'CONNOR.

Witnesses:
CARRIE GAILING,
ANN BAKER.